United States Patent [19]

Mori et al.

[11] Patent Number: 4,640,023

[45] Date of Patent: Feb. 3, 1987

[54] APPARATUS FOR MANUFACTURING POWDERED SILICON NITRIDE

[75] Inventors: Masaaki Mori; Akira Sano; Yushi Horiuchi; Yoshihiro Okumura, all of Kariya, Japan

[73] Assignee: Director General of Agency of Industrial Science and Technology, Tokyo, Japan

[21] Appl. No.: 838,566

[22] Filed: Mar. 11, 1986

[30] Foreign Application Priority Data

Jul. 7, 1985 [JP] Japan ................................. 60-146654
Oct. 3, 1985 [JP] Japan ................................. 60-219129
Oct. 3, 1985 [JP] Japan ................................. 60-219130
Oct. 3, 1985 [JP] Japan ................................. 60-219131

[51] Int. Cl.$^4$ .................... F26B 17/00; F26B 3/00; F26B 19/00; F27B 15/00
[52] U.S. Cl. ..................................... 34/57 A; 34/36; 34/66; 432/58
[58] Field of Search ............... 432/58; 34/36, 57 A, 34/66

[56] References Cited

U.S. PATENT DOCUMENTS 2,528,098 10/1950 White ................................. 432/58
4,020,564 5/1977 Bayliss ................................ 432/58

Primary Examiner—John J. Camby
Attorney, Agent, or Firm—Schwartz, Jeffery, Schwaab, Mack, Blumenthal & Evans

[57] ABSTRACT

A batch-operated furnace apparatus for manufacturing powdered silicon nitride comprises a reaction furnace having a reaction chamber, an upper portion, a bottom portion and a side portion, a feed pipe placed at the upper portion of the reaction furnace for feeding starting materials in a fine or coarse particle form, an exhaust pipe placed at the upper portion of the reaction furnace for removing gasses from the reaction chamber, a gas distributor plate positioned at the bottom portion of the reaction chamber for introducing nitrogen gas into the reaction chamber so as to form a fluidized bed at the bottom portion of the reaction chamber, a heater for heating the starting materials of the fluidized bed within the reaction chamber, a discharge port formed in the gas distributor plate, a discharge pipe joined to the discharge port of the gas distributor plate, a valve seat formed at the discharge port, a discharge valve means having the valve which engages the valve seat of the discharge port, and a guide tube provided at an upper portion of the reaction furnace. The discharge valve means extends through the guide tube in a vertical direction in such a way that the valve of the discharge valve means selectively contacts the valve seat of the discharge port thereby to open or close the discharge port.

14 Claims, 22 Drawing Figures

APPARATUS FOR MANUFACTURING POWDERED SILICON NITRIDE

BACKGROUND OF THE INVENTION

This invention relates to an apparatus for manufacturing powdered silicon nitride using fluidized bed techniques.

In a conventional fluidized bed furnace apparatus for the production of powdered silicon nitride, starting materials are continuously fed into a furnace while reacted powder is continuously removed from the furnace when it overflows. Such a conventional continuous production type apparatus has such a defect that some unreacted powder is removed from the furnace together with the reacted powder.

As disclosed in Japanese Laying-Open No. 60-251108, a batch-operated furnace apparatus is proposed which has a reaction furnace, a discharge port placed at a bottom portion of the reaction furnace, a discharge pipe connected to the discharge port, and a rod-like valve arranged in the discharge pipe in such a way that the valve can slide upwardly on the interior of the discharge pipe so as to close the discharge port if desired. In this batch-type apparatus, some reacted powder easily enters into a clearance between the discharge pipe and the valve so that the vale cannot move smoothly. Also, the effective sectional area of the discharge pipe for removing the reacted powder is so small that all of the reacted powder cannot be quickly discharged or removed.

SUMMARY OF THE INVENTION

The object of this invention is to provide a batch-operated furnace apparatus for producing powdered silicon nitride in which starting materials can be reacted completely in each batch in a fluidized condition and the reacted powder can be quickly discharged or removed from the furnace.

According to this invention, there is provided a batch-operated furnace apparatus for manufacturing powdered silicon nitride which comprises a reaction furnace having a reaction chamber, an upper portion, a bottom portion and a side portion, a fed pipe placed at the upper portion of the reaction furnace for feeding starting materials in a fine or coarse particle form, an exhaust pipe placed at the upper portion of the reaction furnace for removing gasses from the reaction chamber, a gas distributor plate positioned at the bottom portion of the reaction chamber for introducing nitrogen gas into the reaction chamber so as to form a fluidized bed at the bottom portion of the reaction chamber, a heater for heating the starting materials of the fluidized bed within the reaction chamber, a discharge port formed in the gas distributor plate, and a discharge pipe joined to the discharge port of the gas distributor plate, a valve seat formed at the discharge port, a discharge valve means having the valve which engages the valve seat of the discharge port, and a guide tube provided at an upper portion of the reaction furnace, the discharge valve means extending through the guide tube in a vertical direction in such a way that the valve of the discharge valve means selectively contacts the valve seat of the discharge port thereby to open or close the discharge port.

BRIEF DESCRIPTION OF THE DRAWINGS

Preferred embodiments of this invention will now be described by way of example and with reference to the accompanying drawings, in which.

DESCRIPTION OF THE PREFERRED EMBODIMENTS

Figure 1:
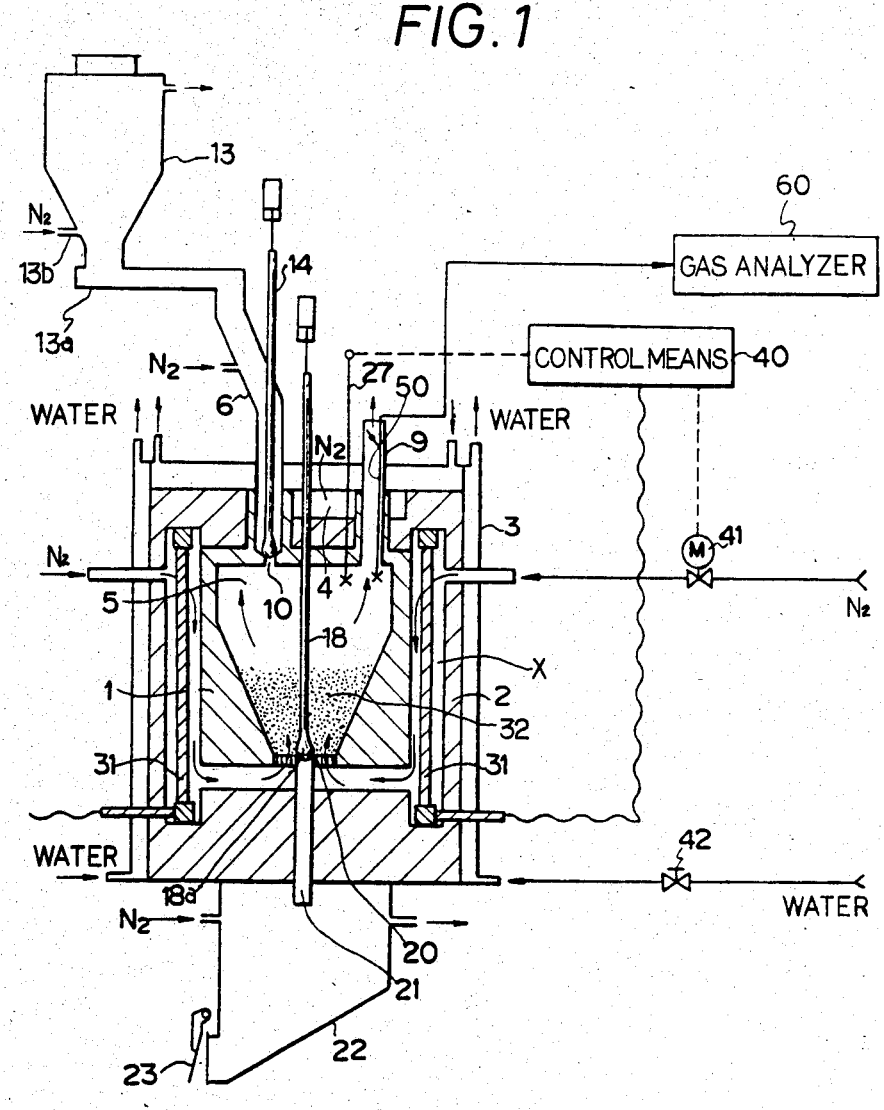
FIG. 1 is an explanatory view showing an apparatus for manufacturing powdered silicon nitride according to an embodiment of this invention.
Figure 2:
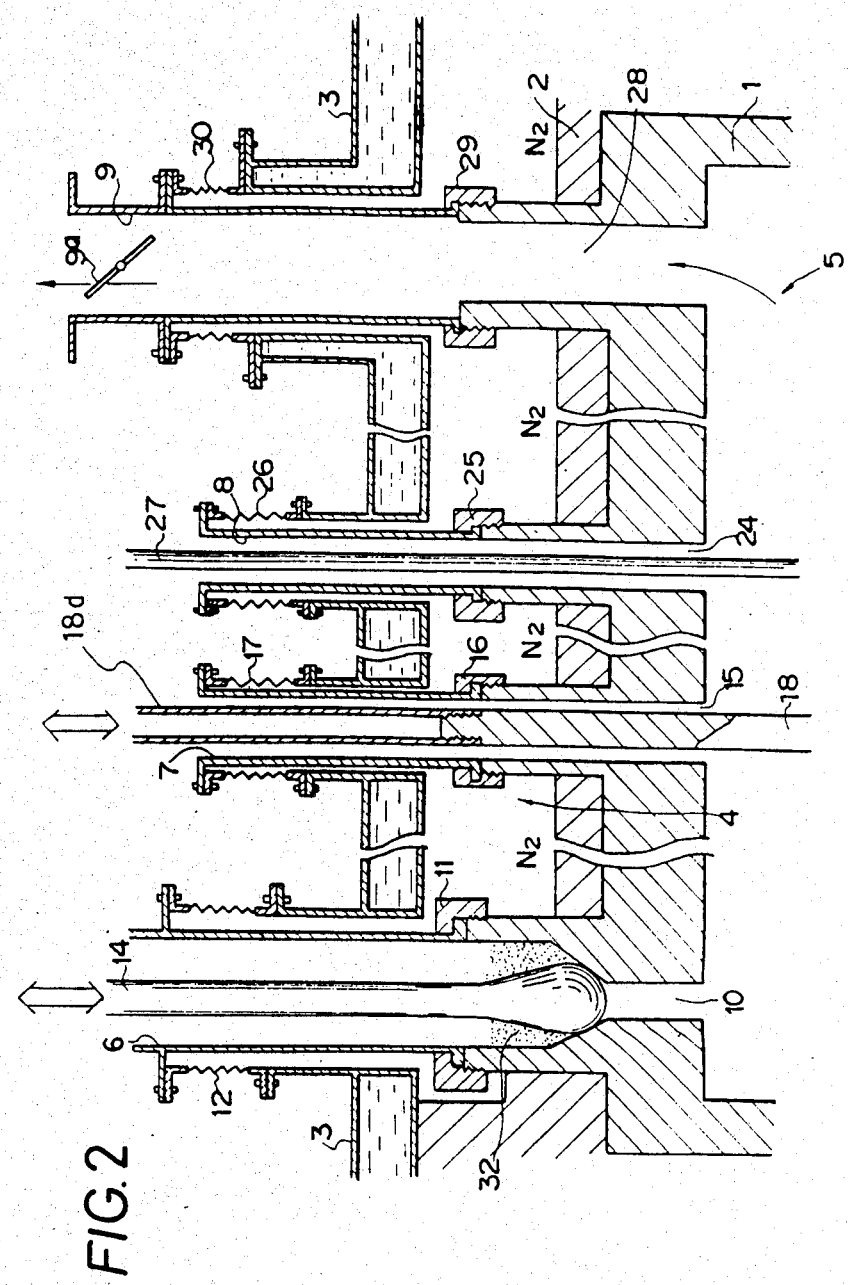
FIG. 2 is an enlarged sectional view showing an upper portion of the apparatus shown in FIG. 1.

In a first embodiment of FIGS. 1 to 4, a reaction vessel or furnace 1 is provided in a thermal insulating material 2 arranged within a housing 3. A space 4 formed between an upper wall of the housing 3 and an upper portion of the thermal insulating material 2 is filled with pressurized nitrogen gas. The housing 3 is cooled by water flowing therethrough. For example, the housing 3 is made of a steel having a passage through which water can flow in the directions of arrows in FIG. 1 for the cooling purpose. Provided at an upper portion of the reaction furnace 1 are a feed pipe 6, a guide tube 7, an insertion tube 8 and an exhaust pipe 9 which penetrate upwardly through the housing 3. The feed pipe 6 may be made of a stainless steel and connected to a feed port 10 of the furnace 1 by way of a nut 11. The feed pipe 6 and the housing 3 are connected by bellows means 12. The feed pipe 6 is connected to a hopper 13. An automatic weighing device 13a is attached to a bottom portion of the hopper 13. Nitrogen gas can flow through an entrance 13b into the feed pipe 6. A feed valve means 14 can move up and down within the feed pipe 6 so as to selectively open and close the feed port 10 by a valve thereof.

The valve tube 9 is made of a stainless steel and connected to an entrance 15 by means of a nut 16. The guide tube 7 and the housing 3 are connected to each other by bellows means 17. A discharge valve means 18 extends through the guide tube 7 in such a manner that the discharge valve means 18 can move up and down in a vertical direction. A discharge valve 18a of the discharge valve means 18 cooperates with a valve seat of a discharge port 19 formed in a gas distributor plate 20 set at a bottom portion of the reaction furnace 1 so as to selectively close or open the discharge port 19. It is preferable that the discharge valve 18a contacts the valve seat of the discharge port 19 along a circular line rather than an area.

A connecting tube 18d made of a stainless steel is connected to an upper end of the discharge valve means 18 because it is at a relatively low temperature. A lower end of a discharge pipe 21 is connected to a cooling chamber 22 which has a door 23. Nitrogen gas flows through the cooling chamber 22.

An insertion tube 8 is made of a stainless steel and connected to an entrance 24 by means of a nut 25. The insertion tube 8 and the housing 3 are connected to each other by bellows means 26. A measuring device 27 is inserted through the insertion tube 8 into the furnace. The measuring device 27 is means for measuring physical characteristics in a reaction space 5 of the reaction furnace 1, for example, such as a thermometer.

The exhaust tube 9 is made of a stainless steel and connected to an exhaust port 28 by means of a nut 29. The exhaust tube 9 and the housing 3 are connected to each other by bellows means 30.

Preferably, the nuts 11, 16, 25, 29 are box nuts made of carbon.

The bellows means 12, 17, 26, 30 are provided for the purpose of sealing the pressurized nitrogen gas in the furnace 1. Since the bellows means 12, 17, 26, 30 can be extended or contracted, even if the feed pipe 6, the guide tube 7, the insertion tube 8 and the exhaust pipe 9 expand due to heat by 10–20 mm, for example, expansion can be absorbed by the bellows means 12, 17, 26, 30.

A space X is formed between a side portion of the reaction furnace 1 and the thermal insulating material 2. A heater 31 is arranged in the space X. The space X constiutes a passage for nitrogen gas and is connected to the space 4. Also, the space X is connected by way of the gas distributor plate 20 to the reaction chamber 5. The heater 31 is made of carbon in a tubular shape and formed of an electric registance type.

Figure 3:
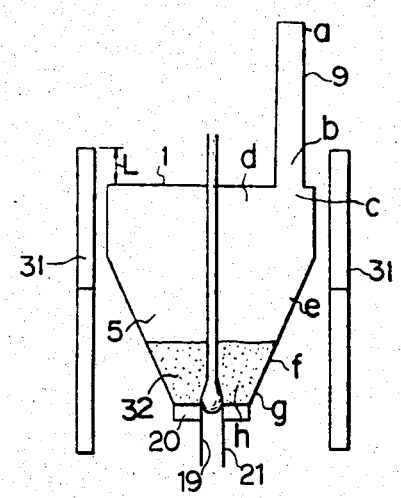
FIG. 3 is an explanatory view showing relationships between a reaction furnace and a heater in the apparatus of FIG. 1 and the temperatures thereof.

As shown in FIG. 3, an upper end of the heater 31 is preferably higher than an upper end face of the reaction furnace 1 by a length L. The heater 31 is composed of 12 elements arranged around the reaction furnace 1. A lower end of the heater 31 is positioned below the bottom surface of the furnace 1.

Control means 40 is to control the temperatures of plural portions in the furnace 1 and the nitrogen gas flows into the furnace. On the basis of results measured by the measuring device 27 such as temperatures, the control means 40 controls the heating temperatures of the heater 31 and the closing or opening operation of a valve 41 for controlling nitrogen the gas flow through the housing 3. A valve 42 is to control water flow. There are also provided a thermocouple thermometer 27 and a gas sampler 50 connected to a CO gas analyzer 60.

Referring to FIG. 3, temperatures at various points "a" through "h" in the reaction chamber 5 and the exhaust pipe 9 will be explained by way of example. An upper portion "a" and a lower portion "b" of the exhaust pipe 9 are at 900° C. and 1200° C, respectively. A point "c" near the exhaust pipe 9 is at 1400° C. An upper point "d" in the reaction chamber 5 is set at 1510° C. An intermediate wall portion "e" of the reaction chamber 5 is at 1515° C. Bottom points "f", "g", "h" in the reaction chamber 5 are at 1525° C. The starting material 32 is maintained substantially at a temperature of 1525° C.

Figure 4:
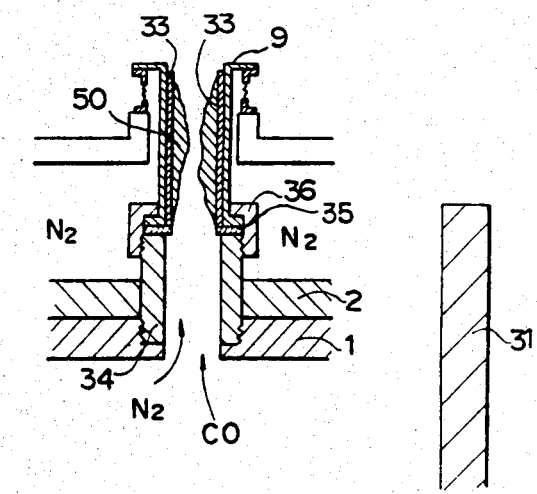
FIG. 4 is a sectional view showing an exhaust pipe equiped with a carbon pipe for use in an apparatus according to this invention.

As shown in FIG. 4, preferably arranged in the exhaust pipe 9 is a pipe like member 33 made of non-metallic material such as carbon. A carbon ring 35 is disposed between a carbon pipe 34 and the exhaust pipe 9. The pipe like member 33 is supported by the carbon ring 35. The exhaust pipe 9 and the pipe 34 are connected to each other by a carbon box nut 36.

Figure 5:
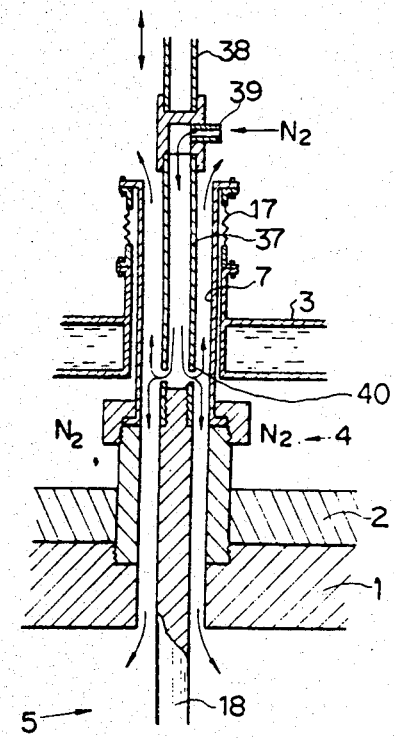
FIG. 5 is a sectional view showing a guide tube filled with nitrogen gas.
Figure 6:
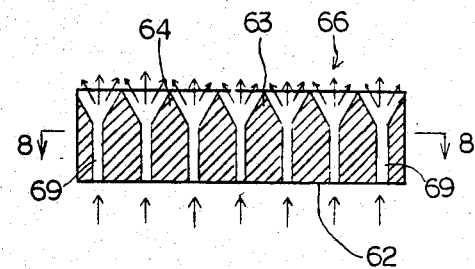
FIG. 6 is a sectional view showing a gas distributor plate for use in an apparatus according to this invention.
Figure 7:
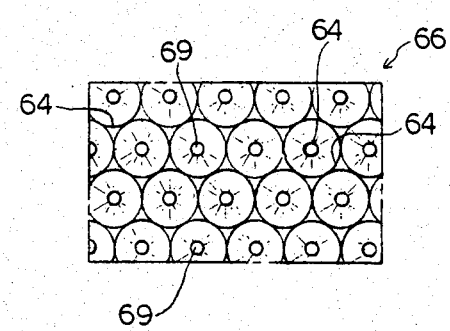
FIG. 7 is a plan view showing an upper portion of the gas distributor plate shown in FIG. 6.
Figure 8:
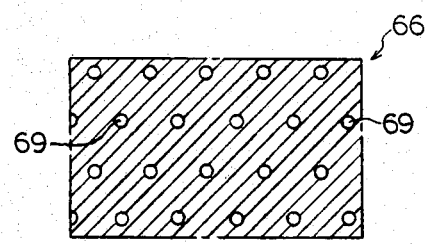
FIG. 8 is a sectional view taken along the line 8—8 of FIG. 6.
Figure 9:
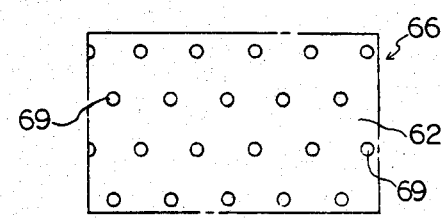
FIG. 9 is a bottom view showing an underside portion of the gas distributor plate shown in FIG. 6.

FIG. 5 shows a modified upper portion of the discharge valve means 18. Connecting tubes 37, 38 are joined to an upper portion of the discharge valve means 18. The connecting tube 37 has a nitrogen gas introducing portion 39. Plural small openings 40 for injecting nitrogen gas is placed near a lower end of the connecting tube 37. The nitrogen gas is always injected through the small openings 40 of the connecting tube 37 thereby to provide a nitrogen gas seal between the guide tube 7 and the discharge valve means 18. The nitrogen gas is preferably jetted through the small openings 40 at a flow rate of 25 l/minute.

The discharge valve means 18 and the feed valve 14 are made of carbon.

In this specification, the wording "nitrogen gas" is broadly used to include not only $N_2$ gas but also other non-oxidation gasses such as $NH_3$ gas, $N_2$-$H_2$ gas, $N_2$-innert gas, or a combination thereof.

An operation of the above-stated apparatus will be explained.

Starting materials to be inserted into the hopper 13 may be fine or coarse particles such as pellets. For example, silica powder 1 part, carbon black powder 0.5 parts and silicon nitride powder 0.1 parts are mixed with each other to produce pellets each having a diameter of 1.0–2.0 mm. After nitrogen substitution of such pellets are made in the hopper 13, a predetermined weight of the pellets which are weighed by the weighing means 13a are fed into the reaction chamber 5 at a temperature of 1400° C. by pulling up the feed valve means 14. For example, the powder 32 of 10kg is fed thereinto and then the feed valve 14 is closed.

On the other hand, the nitrogen gas is preheated when it flows near the heater 31 within the space X. The preheated gas is introduced into the reaction chamber 5 by way of the gas distributor plate 20 thereby to fluidize the pellets in the reaction chamber 5. As a result, so called deoxidation-nitriding reaction takes place. The unreacted nitrogen gas and the exhaust gas are removed through the exhaust pipe 9 to the atmosphere. A damper 9a (FIG. 2) in the exhaust pipe 9 controls the exhaust gas flow.

The flow rate of nitrogen gas is selected so as to flow at a high rate of causing the mass of particles to become fluidized, for example, at a rate of 1200 l/minute. The reaction chamber 5 is heated up to 1400°–1530° C. for 5 hours and thereafter maintained at 1535° C.

The CO consentration in the reaction chamber 5 becomes 0 percent seven hours after the powder 32 is fed into the furnace 1. Reaction of the pellets 32 is controlled according to results measured by the measuring device 60 such as CO consentrations. After a CO consentration reaches to 0, the discharge valve means 18 and the door 23 of the cooling chamber 22 are opened so that all reacted powder 32 in the reaction chamber 5 is removed or discharged through the discharge port and the discharge pipe. The reacted powder 32 is decarbonized at 700° C. thereby to obtain powdered silicon nitride. One example of powdered silicon nitride obtained in the above-stated manner has $O_2$ 1.65%, C 0.80% and free $SiO_2$ 1.10%. X-ray diffraction results of the powdered silicon nitride show alpha phase rate of 99% and a very high quality of powder can be obtained.

If desired, the damper 9a is closed when the discharge valve means 18 is opened. The discharge valve means 18 is closed after the reacted powder is discharged or removed. The reacted powder 32 can be held in the cooling chamber 22 for a predetermined period before it is discharged or removed.

The bellows means 12, 17, 26, 30 permit the nitrogen gas in the spaces X, 4 to be pressurized up to 400–600 mmHg. A gas seal is provided between the housing 3 and the furnace 1 whereby the nitrogen gas can be introduced at a high flow rate. Since the reaction chamber 5 can be maintained at a high pressure, the starting materials can be maintained in an improved fluidized condition. As a result, a reaction time can be reduced. Assuming that a nitrogen gas pressure in as a conventional method is obtained, a relatively small volume of nitrogen gas is used. Thus, the nitrogen gas can be saved.

An apparatus for manufacturing powdered silicon nitride according to this invention can have a large effective sectional area for discharging the reacted powder. For instance, the reacted powder of 5 kg can be removed from the furnace for 1 minute or less.

FIGS. 6 to 17 show other various gas distributor plates.

In the embodiment of FIGS. 6 to 9, a gas distributor plate 66 has many gas orifices 69 which penetrate from an underside surface 62 of the gas distributor plate 66 to upper surface 63 thereof. Many gas orifices 69 are arranged at predetermined intervals in the whole area of the gas distributor plate 66. The gas orifices 69 are widened at an upper portion 13 thereof in the form of a funnel. Adjacent orifices are very close to each other so that their upper edges are overlapped. An inclining angle of a front edge portion 64 is larger than a repose angle of the powder 32, for example, such as 70 degrees. There are substantially no flat surface at the upperside of the gas distributor plate 66 so that no powder 32 can remain. For such a reason, an excellent contact condition of the powder 12 and the nitrogen gas can be obtained. The nitrogen gas can be uniformly distributed thereby to form an excellent fluidized bed of the particles.

Figure 10:
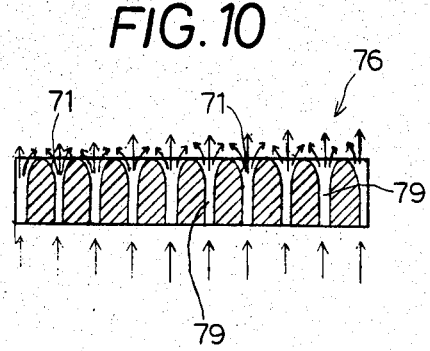
FIG. 10 is a sectional view showing a further gas distributor plate.

FIG. 10 shows another gas distributor plate 76. An upper portion 71 of each gas orifices 79 formed in the gas distributor plates 76 is in a funnel shape with a curved portion.

Figure 11:
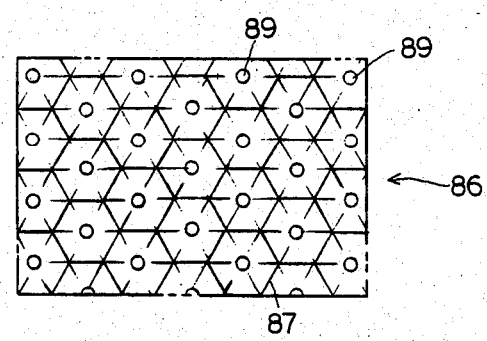
FIG. 11 is a plan view showing an upper portion of another gas distributor plate.
Figure 12:
FIGS. 12 to 15 are sectional views showing other various gas distributor plates, respectively.
Figure 13:
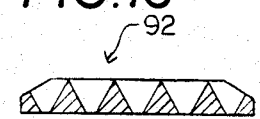
Figure 14:
Figure 15:
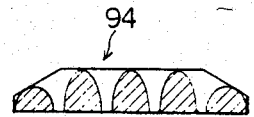

FIG. 11 shows a further gas distributor plate 86. An upper edge portion of each gas orifices 89 is formed in a equilateral hexagon. In this embodiment, there is no flat surface at an upperside of the gas distributor plate 86.

FIGS. 12 to 15 show other various gas distributor plates 91 through 94. In each case, gas orifices are widened at an upper portion thereof so that there is not flat portion. Therefore, the nitrogen gas can be uniformly distributed.

Figure 16:
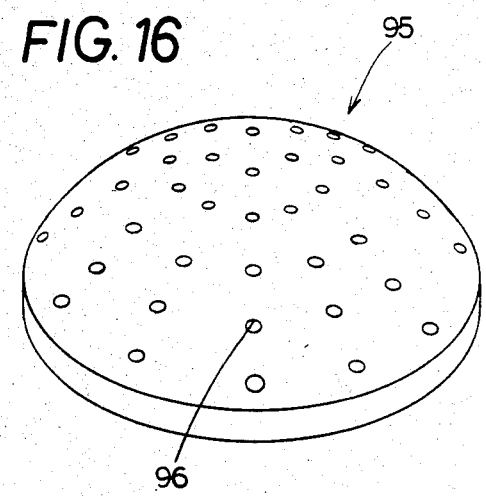
FIG. 16 is a perspective view showing a further gas distributor plate.
Figure 17:
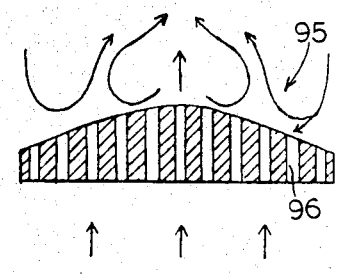
FIG. 17 is a sectional view showing a portion of the gas distributor plate shown in FIG. 16.

FIGS. 16 to 17 show another gas distributor plate 95 in which an upper surface thereof is in the form of a mountain. A central portion of the gas distributor plate 95 is thicker than its peripheral portion. The gas distributor plate 95 has many through-holes in the height directions.

Each of the gas distributor plates shown in FIGS. 6 to 17 has a discharge port which is connected to the upper end of the discharge pipe 21 as in the embodiment of FIG. 1 although not shown.

Figure 18:
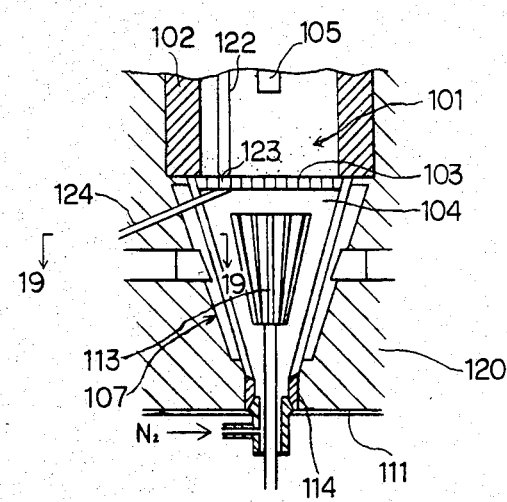
FIG. 18 is a sectional view showing another embodiment of this invention.
Figure 19:
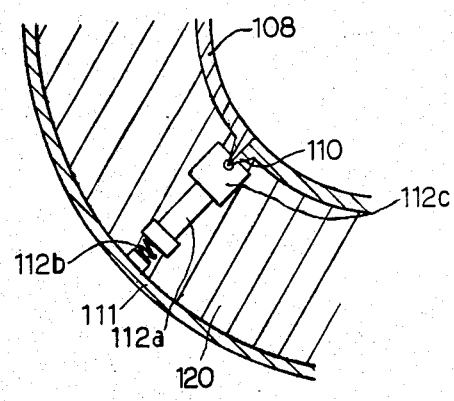
FIG. 19 is a sectional view taken along the line 19—19 of FIG. 18 showing a preheated chamber and its related structure in the embodiment of FIG. 18.

FIGS. 18 and 19 show a further embodiment of this invention. A reaction chamber 101 is formed by a large lining 102 made of carbon and preferably composed of plural small blocks in a cylindrical shape. A heater 105 extends vertically within the reaction chamber 102. The heater 105 is connected to an electric source(not shown). A gas distributor plate 103 is placed in a bottom portion of the reaction chamber 101. A preheating chamber 104 is formed under the reaction chamber 101. The gas distributor plate 103 is disposed between the reaction chamber 101 and the preheating chamber 104 and has many through holes which are oriented vertically.

The preheating chamber 104 is formed by a preheating portion 107 of a reverse-cone shape. The preheating portion 107 may be made of one piece or plural divided side walls 108 as shown in FIG. 19. These side walls 108 are made of minute ceramics such as carbon, SiC, $Si_3N_4$, sialon (Silicon Aluminum Oxynitride) or the like.

In the embodiment of FIGS. 18 and 19, the preheating portion 107 is composed of four divided side walls 108. A press member 112 is disposed between two closely set projections 110 and a cylindrical steel cover 111 constituting a portion of a housing. A press member 112 has a rod portion 112a, a coil 112b set between the cover 111 and an outer end of the rod 112a, and a press element 112c placed between the projections 110 and an inner end of the rod 112a. The press element 112c is made of a heat resistant ceramic material for preventing a joint portion of the divided side walls 108 from separating. If desired, a paste can be attached to the joint portion thereof for the gas sealing purpose.

Each divided side wall 108 of the preheating portion 107 is fixed at its top end to the gas distributor plate 103 and fixed at its lower portion to a bottom member 114 of the preheating portion 107.

The gas distributor plate 103 has a discharge port 121. A discharge valve means 122 extends from an upper portion of the reaction chamber 101 in a vertical direction and has a valve portion 123 at its lower end which selectively contacts a seat portion of the discharge port 121 thereby to close or open the discharge port 121. A discharge pipe 124 is connected to the discharge port 121.

A heater 113 is placed within the preheating chamber 104 and has many radiator fins. A lower end of the heater 113 comes out of the steel cover 111 and is joined to an electric source (not shown). Although the heater 113 is preferably of a carbon heat resistance type, it may be of a high frequency induction heating type.

A thermal insulating material 120 is arranged between the steel cover 111 and the lining 102 as well as between the steel cover 111 and the preheating portion 107.

Figure 20:
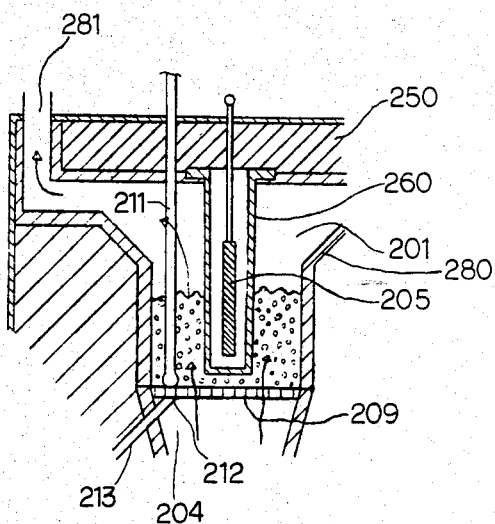
FIGS. 20 to 22 are sectional views showing other three embodiments of this invention, respectively.

In the embodiment of FIG. 20, a heater 205 is a reaction chamber 201 vertically extends from an upper end 250 of the reaction chamber 202 and is covered by a cover tube 260. The heater 205 is connected to an electric source (not shown). Heat efficiency increases as the heater 205 is placed in the reaction chamber 201.

The reaction chamber 201 is formed in a furnace 280 having a discharge port 281. A preheating chamber 204 is placed under the reaction chamber 201. A gas distributor plate 209 is disposed between the reaction chamber 201 and the preheating chamber 204. A heater is arranged in the preheating chamber 204 although not shown.

A discharge valve means 211 extends vertically through an upper end portion 250 of the furnace 280 within the reaction chamber 201 and has a valve which contacts selectively a valve seat of a discharge port 212 formed in the gas distributor plate 209. A discharge pipe 213 is joined to the discharge port 212 of the gas distributor plate 209.

Figure 21:
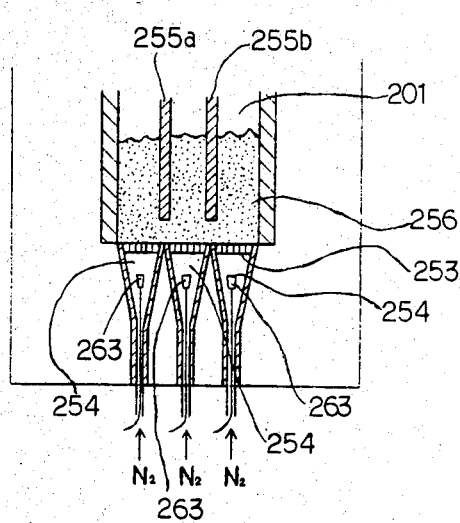

In the embodiment of FIG. 21, two heaters 255a and 255b are arranged within the reaction chamber 201. Each lower portion of the heaters 255a, 255b is positioned in a fluidized bed 256 formed on a gas distributor plate 253.

A plurality of preheating chambers 254 are formed in a funnel shape and connected by way of the gas distributor plate 253 to a reaction chamber 201. Plural heaters 263 are positioned in the preheating chambers 254, respectively.

Figure 22:
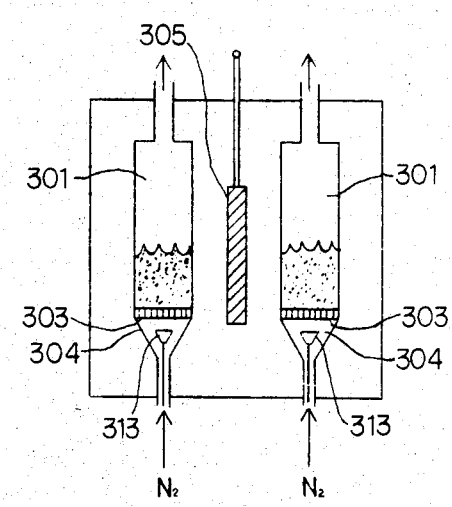

In the embodiment of FIG. 22, a plurality of reaction chambers 301 are arranged around a common heater 305 joined to an electric source (not shown). A plurality of preheating chambers 304 are placed by way of a gas distributor plate 303 under the reaction chamber 301. A heater 313 is arranged in each of the preheating chambers 304.

In the embodiment of FIGS. 21 and 22, although not shown, a discharge valve means extends vertically from an upper portion of the reaction chambers 201, 301 toward its bottom. The gas distributor plates 209, 303 each has a discharge port corresponding to the discharge valve means in such a way that a discharge valve of the discharge valve means can selectively contact a valve seat of the discharge port in the gas distributor plate 209, 303. A discharge pipe (not shown) is joined to the discharge port of the gas distributor plate 209, 303.

The gas distributor plates shown in FIGS. 6 to 17 can be applied to the embodiments of FIGS. 18 to 22.

In the embodiments of FIGS. 18 through 22, the preheating chambers constitute a pressure chamber for pressurizing nitrogen gas to a high degree.

In this specification, the wording "powder" is broadly used to cover all fine and coarse particles, or any other particles including pellets.

What is claimed is:

1. A batch-operated furnace apparatus for manufacturing powdered silicon nitride comprising;
   a reaction furnace having a reaction chamber, an upper portion, a bottom portion and a side portion;
   a feed pipe placed at the upper portion of the reaction furnace for feeding starting materials in a fine or coarse particle form;
   an exhaust pipe placed at the upper portion of the reaction furnace for removing gasses from the reaction chamber;
   a gas disributor plate positioned at the bottom portion of the reaction chamber for introducing nitrogen gas into the reaction chamber so as to form a fluidized bed at the bottom portion of the reaction chamber;
   a heater for heating the starting materials of the fluidized bed within the reaction chamber;
   a discharge port formed in the gas distributor plate;
   a discahrge pipe joined to the discharge port of the gas distributor plate;
   a valve seat formed at the discharge port;
   a discharge valve means having the valve which engages the valve seat of the discharge port; and
   a guide tube provided at an upper portion of the reaction furnace;
   the discharge valve means extending through the guide tube in a vertical direction in such a way that the valve of the discharge valve means selectively contacts the valve seat of the discharge port thereby to open or close the discharge port.

2. The apparatus of claim 1 wherein a housing covers the upper portion and the side portion of the reaction furnace and wherein a space formed between the reaction furnace and the housing is filled with nitrogen gas.

3. The apparatus of claim 2 wherein the feed pipe, the exhaust pipe and the guide tube are connected to the housing by way of bellows means.

4. The apparatus of claim 2 wherein the housing is cooled by water which flows through the housing.

5. The apparatus of claim 1 wherein a damper is placed within the exhaust pipe so as to close a passage in the exhaust pipe when reacted powder is discharged.

6. The apparatus of claim 1 wherein the gas distributor plate has plural gas orifices which are widened at their upper portion.

7. The apparatus of claim 1 wherein an upper surface of the gas distributor plate is formed in a mountain shape.

8. The apparatus of claim 2 wherein the heater is placed in a space formed between the reaction furnace and the housing so as to constitute a preheating chamber and wherein nitrogen gas is preheated by the heater and then introduced by way of the gas distributor plate into the reaction chamber.

9. The apparatus of claim 1 wherein a preheating chamber is formed under the reaction chamber and wherein a preheater is placed in the preheating chamber for preheating nitrogen gas before the nitrogen gas enters through the gas distributor plate into the reaction chamber.

10. The apparatus of claim 9 wherein the preheating chamber is formed by a plurality of divided walls.

11. The apparatus of claim 9 wherein the heater is placed in the reaction chamber.

12. The apparatus of claim 1 wherein a plurality of preheating chambers are formed under the reaction chamber and wherein a plurality of preheaters are placed in the preheating chambers, respectively.

13. The apparatus as defined in claim 8 wherein the preheating chamber constitutes a pressure chamber for pressurizing the nitrogen gas.

14. The apparatus as defined in claim 2, wherein a housing covers the bottom portion of the reaction furnace and wherein a space formed between the reaction furnace and the housing is filled with nitrogen gas.

* * * * *